United States Patent [19]

Hofbauer et al.

[11] 4,195,597

[45] Apr. 1, 1980

[54] TURBULENCE CHAMBER DIESEL ENGINE

[75] Inventors: Peter Hofbauer; Cornelia Schwarz, both of Wolfsburg, Fed. Rep. of Germany

[73] Assignee: Volkswagenwerk Aktiengesellschaft, Wolfsburg, Fed. Rep. of Germany

[21] Appl. No.: 874,471

[22] Filed: Feb. 2, 1978

[30] Foreign Application Priority Data

Feb. 9, 1977 [DE] Fed. Rep. of Germany ....... 2705271

[51] Int. Cl.² ............................................ F02B 23/06
[52] U.S. Cl. ............................. 123/30 C; 123/32 A; 123/193 P
[58] Field of Search .............. 123/30 C, 32 A, 193 P, 123/193 R

[56] References Cited

U.S. PATENT DOCUMENTS

| 2,113,711 | 4/1938 | Ricardo ............................ 123/30 C |
| 3,044,454 | 7/1962 | Sutton ................................ 123/32 A |
| 3,083,700 | 4/1963 | Madak et al. ..................... 123/32 A |
| 3,814,068 | 6/1974 | Kimbara et al. .................. 123/32 A |
| 3,872,841 | 3/1975 | Kimbara et al. .................. 123/32 A |
| 3,965,872 | 6/1976 | Taira et al. ....................... 123/193 P |

Primary Examiner—Charles J. Myhre
Assistant Examiner—Craig R. Feinberg
Attorney, Agent, or Firm—Brumbaugh, Graves, Donohue & Raymond

[57] ABSTRACT

In a diesel engine, provided with a turbulence chamber connected to the main combustion chamber by a passage, toroid-shaped recesses are provided on the end surface of the piston adjacent the opening of the passage to guide flame gases emerging from the turbulence chamber.

3 Claims, 6 Drawing Figures

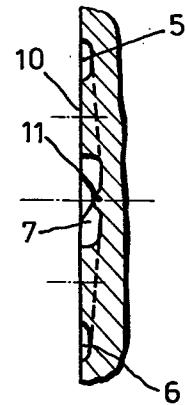
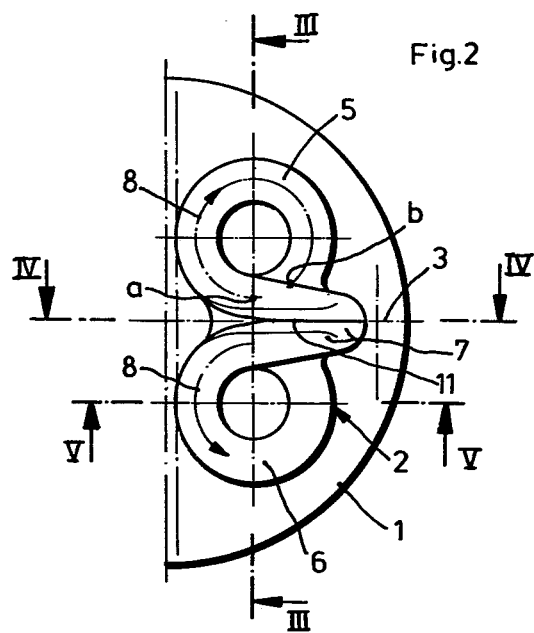
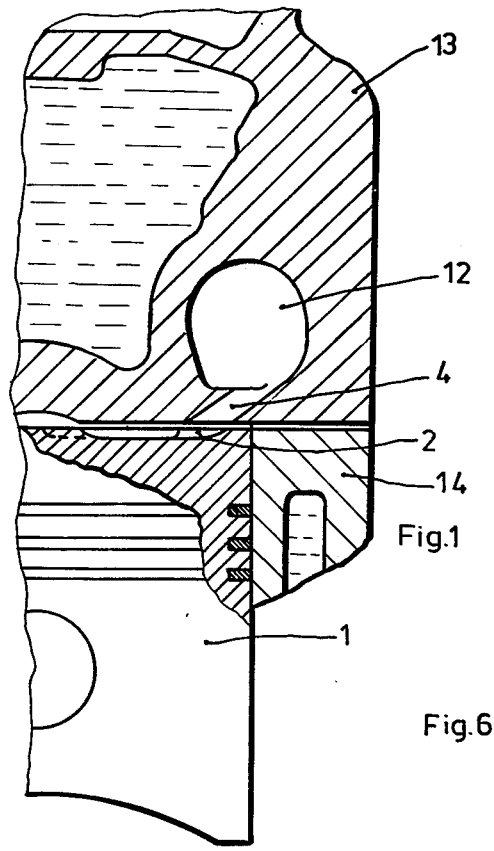
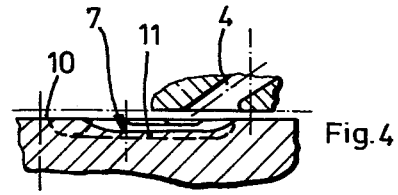
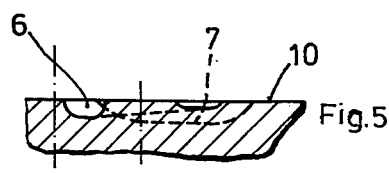
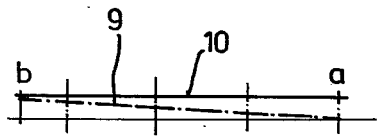

TURBULENCE CHAMBER DIESEL ENGINE

BACKGROUND OF THE INVENTION

This invention relates to diesel engines, and in particular to diesel engines having a turbulence chamber connected to the main combustion chamber by a passage. In prior German Patent Application No. 2,503,218, there is disclosed an engine of this type, wherein the inner end face of the piston is provided with recesses adjacent the opening of the passage into the main combustion chamber. The recesses disclosed in the prior application are in the form of circular disks symmetrically arranged with respect to a diameter of the piston adjacent the opening of the passage from the turbulence chamber. An inlet flow channel is provided between the disk-shaped recesses for the guiding of flaming gases flowing from the passage into the recesses. The recesses provide for rapid and uniform distribution of flaming gases emerging from the turbulence chamber into the main combustion chamber, thereby to promote rapid and uniform combustion.

The prior application also discloses an embodiment wherein the inlet flow channel has a tapered depth, starting at maximum depth adjacent the passage opening and decreasing in the direction of the center of the piston.

In such engines, fuel is injected into the turbulence chamber. Upon compression, combustion is initiated in the rich fuel-air mixture in the turbulence chamber and flaming gases flow through the passage into the main combustion chamber. The recesses provided on the end surface of the piston promote uniform distribution of flaming gases in the main combustion chamber so that the entire charge can be subjected to complete combustion, thereby promoting fuel efficiency and low emissions of hydrocarbons and partially combusted fuel.

One problem with this prior design arises in diesel engines having a relatively small piston displacement. In such engines, it becomes difficult to achieve the required compression ratio for spontaneous ignition, because the nominal separation between the piston and cylinder head at top dead center must be adequate to allow for dimensional variations arising from manufacturing tolerances and dynamic operating forces. The provision for an adequate nominal separation of the piston and cylinder head uses up a portion of the available minimum volume of the combustion chamber, and therefore limits the volume available for the recesses in the piston end surface.

It is therefore an object of the present invention to provide a new and improved diesel engine having a turbulence chamber connecting to a main combustion chamber by a passage, and recesses in the piston end surface for guiding the flow of flaming gases from the passage into the main combustion chamber.

It is a further object of the invention to provide such an engine wherein the recesses utilize a small portion of the available combustion chamber volume.

It is a still further object of the invention to provide such an engine wherein the recesses are arranged to provide improved guiding of the flow of flaming gases into the main combustion chamber, and thereby provide a more favorable distribution of flaming gases in the main combustion chamber.

SUMMARY OF THE INVENTION

In accordance with the present invention, there is provided an improvement in a diesel engine having at least one main combustion chamber enclosed by a cylinder, a cylinder head, and a piston, and a turbulence chamber communicating with the main combustion chamber by a passage in the cylinder head. In such engines, an end surface of the piston, which forms an internal wall of the main combustion chamber may be provided with recesses symmetrically arranged with respect to the passage. In accordance with the invention, the recesses are toroid-shaped channels which meet in a radially extending inlet flow channel arranged adjacent the passage.

In accordance with a preferred embodiment of the invention, each of the toroid-shaped channels has a tapered depth from the surface of the piston, the channel depth decreasing in a circumferential direction on each toroid which corresponds to radial inward flow in the inlet flow channel. The channels have a maximum depth in the area of the inlet flow channel. The inlet flow channel may also be provided with a central web, dividing the channel into two channel passages, each communicating with one of the toroid-shaped channels.

Because the recesses in accordance with the invention are toroid-shaped, and the central portion of each recess is at approximately the level of the piston end surface, there is a substantial saving in the volume required for the recesses, which can advantageously be used for deepening the recess in other regions, particularly in the vicinity of the inlet flow channel adjacent the passage opening. The central portion of the recesses, even if it were completely removed, does not contribute substantially to the guidance and distribution of flaming gases in the combustion chamber. Tapering of the channel depth additionally reduce the volume required for each recess, and makes this volume available for deepening the inlet flow channel to achieve more favorable flow dynamics. No disadvantage to gas flow in the channel arises out of the tapered depth, because the gases tend to escape over the edge of the recesses as they flow around the channels, and consequently, the volume of gases in the channel is reduced as the flow proceeds in a circumferential direction. The central web of the inlet flow channel promotes a better distribution of the flow of flaming gases from the inlet channel into the two toroid-shaped channels. Thus, a more even distribution between the two channels is achieved and the flame gases are more uniformly distributed within the main combustion chamber.

For a better understanding of the invention, together with other and further objects, reference is made to the following description, taken in conjunction with the accompanying drawings, and its scope will be pointed out in the appended claims.

BRIEF DESCRIPTION OF THE DRAWINGS

FIG. 1 is a cross-sectional view of a piston, cylinder, and cylinder head illustrating the arrangement of a turbulence chamber, connecting passage, and recesses on a piston end surface in accordance with the invention.

FIG. 2 is an end view of a piston surface showing the toroid-shaped recesses in accordance with the invention.

FIG. 3 is a partial cross-section of the piston shown in FIG. 2.

FIG. 4 is another partial cross-section of the piston shown in FIG. 2.

FIG. 5 is another partial cross-section of the piston shown in FIG. 2.

FIG. 6 is a graph illustrating the tapered depth of the toroid-shaped channel of the piston of FIG. 2.

DESCRIPTION OF THE INVENTION

FIG. 1 is a cross-sectional view illustrating a piston 1 arranged within a cylinder 14 which is closed by a cylinder head 13. The space confined by the piston 1, cylinder 14, and cylinder head 13 comprises the main combustion chamber of the diesel engine. Formed within cylinder head 13 is a turbulence chamber 12 which is connected to the main combustion chamber by a passage 4. Various details of the engine, including inlet and exhaust ports, valves, and injection nozzles are well known to those skilled in the art and are therefore not specifically illustrated.

In operation, fuel is injected into turbulence chamber 12 of the FIG. 1 engine and therein mixed with air. Upon compression, spontaneous ignition is initiated in the turbulence chamber, and the resulting flaming gases flow through the connecting passage 4 into the main combustion chamber. In accordance with the present invention, the piston 1 is provided with a recess 2 on the end surface 10, which forms an internal wall of the main combustion chamber, for the purpose of guiding the flow of flaming gases and promoting a uniform distribution of the flaming gases within the main combustion chamber.

FIG. 2 is a partial end view of the piston 1 showing the recesses 2 provided for the guiding of flaming gases. The recesses are formed on one side of the piston end surface and are symmetrically arranged with respect to a piston diameter 3 which corresponds to the center of the opening of passage 4 into the main combustion chamber. The cross-sectional view of FIG. 4, which is taken alone diameter 3, illustrates the relative location of the passage and recesses when the piston is at top dead center, which corresponds to the approximate piston position when flaming gases from the turbulence chamber flow into the main combustion chamber.

As illustrated in the drawings, the recesses on the end surface take the form of an inlet flow channel 7, in which gases flow radially inward from the passage opening, and a pair of toroid-shaped channels 5 and 6 which connect with the inlet flow channel 7. Gases directed into inlet flow channel 7 enter the toroid-shaped channels 5 and 6 tangentially and flow around the toroid channels in a turbulence motion indicated by arrows 8.

Since the toroid-shaped channels are not completely closed, the gases escape over the top edge of the channels during the turbulent flow, thereby reducing the gases flow volume in the circumferential direction corresponding to radially inward flow in the inlet flow channel. Because of the decreasing volume of gas flow, the depth of the toroid-shaped channels can be tapered from a maximum depth at the junction of the inlet flow channel, designated a, to a minimum depth at the point where the toroid-shaped channels re-enter the inlet flow channel, designated b. This tapered depth is illustrated as a function of circumferential distance in the graph of FIG. 6, wherein the level of the piston end surface is designated as 10 and the level of the bottom of the channel is designated as 9. The tapering of the toroid-shaped channels is also illustrated in the cross-sectional views of FIGS. 5 and 6.

The cross-sectional view of FIG. 3 illustrates another aspect of the invention, the inlet flow channel is divided by a central web 11 into two channel passages. Each of the channel passages connects to one of the toroid-shaped channels, so that flames flowing out of passage 4 are immediately divided into the two channel passages, and half of the flame volume is distributed to each of the toroid-shaped channels. This central dividing web 11 thereby promotes a more uniform distribution of flaming gases in the main combustion chamber and avoids the possibility that uneven distribution may result from localized turbulent flow.

The arrangement according to the present invention reduces the volume of the combustion chamber utilized to provide piston recesses for guiding the flow of gases from the turbulence chamber. The use of a toroid-shaped channel rather than a disk-shaped recess results in a saving of volume corresponding to the central portion of the toroid. The tapering of the toroid-shaped channel also reduces the volume which would otherwise be required for this channel. The volume saving features together enable the design of an inlet flow channel having a greater depth in the region of greatest gas flow, particularly adjacent the opening of the passage from the turbulence chamber. Greater depth in this region improves the efficiency of the flow channels and the guiding of flaming gases into the toroid-shaped recess, and thereby promotes more efficient distribution of the flaming gases over the entire volume of the main combustion chamber.

While there has been described what is believed to be the preferred embodiment of the invention, those skilled in the art will recognize that other and further modifications may be made thereto without departing from the true spirit of the invention, and it is intended to claim all such embodiments as fall within the true scope of the invention.

We claim:

1. In a diesel engine having at least one main combustion chamber enclosed by a cylinder, a cylinder head and a piston, and a turbulence chamber communicating with said main combustion chamber by a passage in said cylinder head, wherein an end surface of said piston forming an internal wall of said main combustion chamber is provided with recesses symmetrically arranged with respect to said passage, the improvement wherein said recesses are toroid-shaped channels which meet in a radially extending inlet flow channel arranged adjacent said passage, each of said toroid-shaped channels surrounding a central area at the level of said piston end surface.

2. The improvement specified in claim 1 wherein each of said toroid-shaped channels has a tapered depth from said end surface, said depth decreasing in a circumferential direction on each channel corresponding to radially inward flow in said inlet flow channel, the maximum depth being at said inlet flow channel.

3. The improvement specified in claim 1 wherein said inlet flow channel is provided with a central web, dividing said inlet flow channel into two channel passages, each communicating with one of said toroid-shaped channels.

* * * * *